(12) United States Patent
Namiki et al.

(10) Patent No.: US 10,021,272 B2
(45) Date of Patent: Jul. 10, 2018

(54) IMAGE READING APPARATUS AND IMAGE READING METHOD FOR PERFORMING BACKGROUND REMOVAL PROCESSING ON IMAGE DATA

(71) Applicant: FUJI XEROX CO., LTD., Tokyo (JP)

(72) Inventors: Tatsuya Namiki, Kanagawa (JP); Chihiro Matsuguma, Kanagawa (JP); Noriko Arai, Kanagawa (JP); Kenji Ueda, Kanagawa (JP); Yurie Ishikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/251,891

(22) Filed: Aug. 30, 2016

(65) Prior Publication Data

US 2017/0280017 A1    Sep. 28, 2017

(30) Foreign Application Priority Data

Mar. 22, 2016 (JP) .................................. 2016-057019

(51) Int. Cl.
*G06K 15/00* (2006.01)
*H04N 1/409* (2006.01)
*H04N 1/00* (2006.01)
*H04N 1/407* (2006.01)
*H04N 1/403* (2006.01)

(52) U.S. Cl.
CPC ....... *H04N 1/4097* (2013.01); *H04N 1/00013* (2013.01); *H04N 1/00037* (2013.01); *H04N 1/00084* (2013.01); *H04N 1/00092* (2013.01); *H04N 1/407* (2013.01); *H04N 1/403* (2013.01); *H04N 2201/0081* (2013.01)

(58) Field of Classification Search
None
See application file for complete search history.

(56) References Cited

U.S. PATENT DOCUMENTS 7,057,767 B2 * 6/2006 Tretter ................. H04N 1/4095
358/1.9
8,749,850 B2 * 6/2014 Ikegawa ............ H04N 1/00013
358/1.13

(Continued)

FOREIGN PATENT DOCUMENTS

JP    2010-063091 A    3/2010

*Primary Examiner* — Miya J Williams
(74) *Attorney, Agent, or Firm* — Oliff PLC (57) ABSTRACT

An image reading apparatus includes an image data obtaining unit, a foreign material position information obtaining unit, and a separation processor. The image data obtaining unit obtains image data read from a document passing over a read area. The foreign material position information obtaining unit obtains foreign material position information read from the read area in which the document is not present. The separation processor separates the image data into plural objects including a background object, detects, by using the foreign material position information, a streak image portion caused by foreign material in the read area and included in the image data, and assumes a pixel of the streak image portion to belong to the background object if the pixel is present in the background object and has a pixel value equal to or smaller than a threshold determined in accordance with a representative value of the background.

2 Claims, 8 Drawing Sheets

(56) References Cited

U.S. PATENT DOCUMENTS

| | | | | |
|---|---|---|---|---|
| 8,810,823 | B2* | 8/2014 | Shimatani | H04N 1/4097 358/1.13 |
| 9,179,012 | B2* | 11/2015 | Kawai | H04N 1/00005 |
| 2005/0185224 | A1* | 8/2005 | Yoshizawa | H04N 1/4097 358/3.26 |
| 2008/0025605 | A1* | 1/2008 | Suino | G06K 9/38 382/173 |
| 2010/0027887 | A1* | 2/2010 | Kawashima | H04N 1/4074 382/171 |
| 2010/0157386 | A1* | 6/2010 | Okumura | G06T 1/00 358/488 |
| 2013/0135637 | A1* | 5/2013 | Ohira | G06T 5/002 358/1.9 |
| 2015/0221073 | A1* | 8/2015 | Matsuyama | G06T 5/20 382/107 |

* cited by examiner

IMAGE READING APPARATUS AND IMAGE READING METHOD FOR PERFORMING BACKGROUND REMOVAL PROCESSING ON IMAGE DATA

CROSS-REFERENCE TO RELATED APPLICATIONS

This application is based on and claims priority under 35 USC 119 from Japanese Patent Application No. 2016-057019 filed Mar. 22, 2016.

BACKGROUND

Technical Field

The present invention relates to an image reading apparatus and an image reading method.

SUMMARY

According to an aspect of the invention, there is provided an image reading apparatus including an image data obtaining unit, a foreign material position information obtaining unit, and a separation processor. The image data obtaining unit obtains, as image data, a read signal read from a document that passes over a read area. The foreign material position information obtaining unit obtains, as foreign material position information, a read signal read from the read area in which the document is not present. The separation processor separates the image data into plural objects including a background object corresponding to a background of the document, detects, by using the foreign material position information, a streak image portion that is caused by foreign material present in the read area and that is included in the image data, and performs a process for assuming a pixel of the streak image portion to belong to the background object if the pixel is present in the background object and has a pixel value equal to or smaller than a threshold determined in accordance with a representative value of the background.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the drawings. In the drawings, components having substantially the same functions are assigned the same reference numerals, and a duplicated description thereof is omitted.

First Exemplary Embodiment

Figure 1:
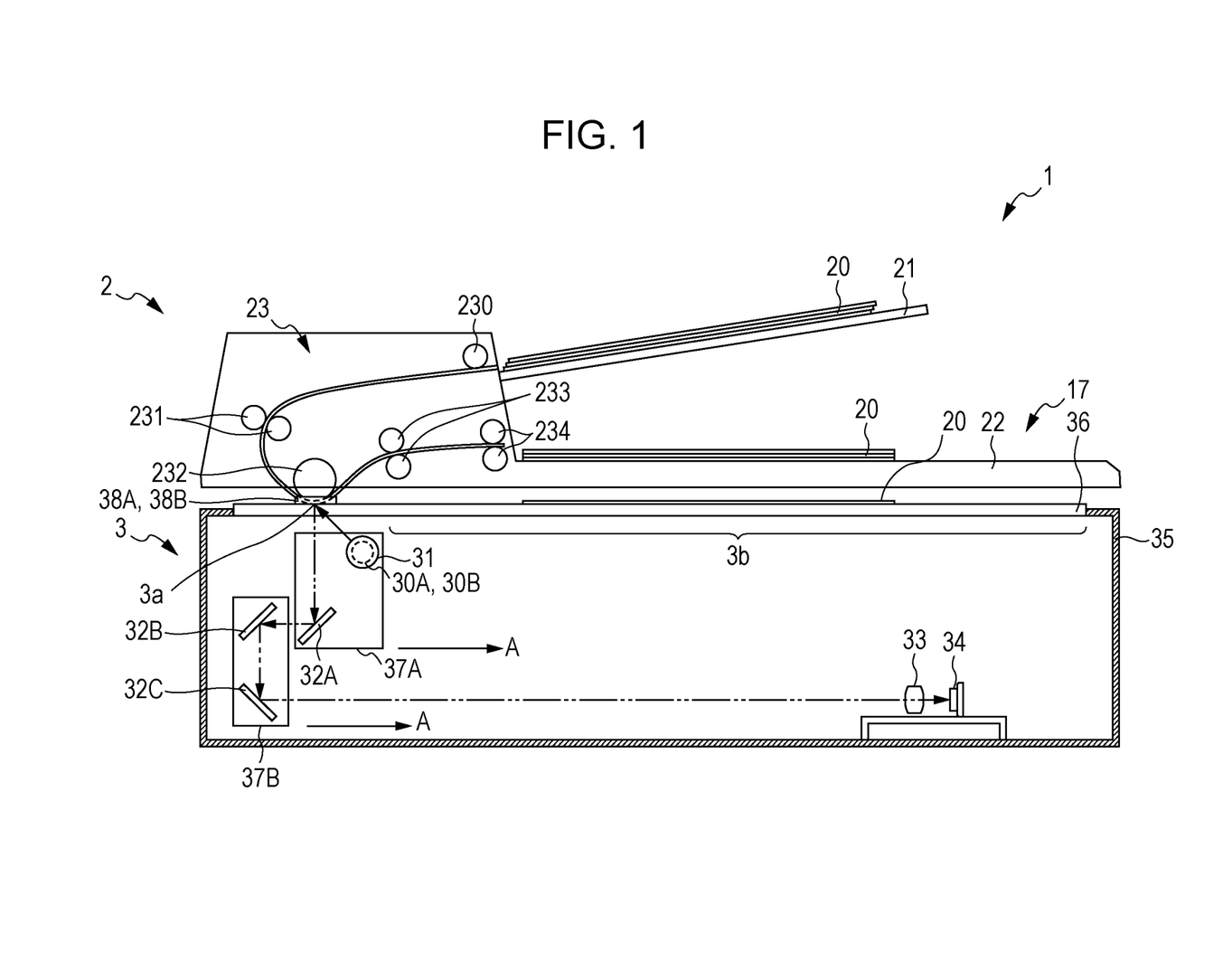
FIG. 1 is a diagram illustrating an example configuration of an image reading apparatus according to a first exemplary embodiment of the present invention.

FIG. 1 is a diagram illustrating an example configuration of an image reading apparatus 1 according to a first exemplary embodiment of the present invention. The image reading apparatus 1 includes a document conveyor 2 that conveys a document 20 loaded onto a paper feed tray 21, and an image reader 3 that optically reads an image on the surface of the document 20.

The image reading apparatus 1 has a "first read mode" and a "second read mode". In the first read mode, a first carriage 37A and a second carriage 37B described below that hold an optical system of the image reader 3 remain stationary, and an image on the surface of the document 20 is read while the document 20 is conveyed by the document conveyor 2 in a sub-scanning direction A so as to pass over a first read area 3a that extends linearly in a main scanning direction. In the second read mode, the document 20 is loaded onto a document loading table 36 and remains stationary, and an image on the surface of the document 20 is read while the first carriage 37A and the second carriage 37B move in the sub-scanning direction A along a second read area 3b having a rectangular shape.

The document conveyor 2 includes a document cover 17 that covers the document loading table 36 and is openable and closable. The document conveyor 2 has an automatic document feeder (ADF) function and includes the paper feed tray 21 onto which the document 20 having an image recorded thereon is loaded, a paper output tray 22 to which the conveyed document 20 is ejected, and a conveying mechanism 23 that conveys the document 20 from the paper feed tray 21 to the paper output tray 22.

The conveying mechanism 23 includes a separating roll 230, conveying rolls 231, a read roll 232, ejecting rolls 233 and 234, and a driving unit not illustrated that drives the separating roll 230, the conveying rolls 231, the read roll 232, and the ejecting rolls 233 and 234. The separating roll 230 separates a bundle of plural documents 20 loaded onto the paper feed tray 21 into individual documents 20 one by one. The conveying rolls 231 convey the individual documents 20. The read roll 232 conveys the individual documents 20 to the first read area 3a. The ejecting rolls 233 and 234 eject the individual documents 20 to the paper output tray 22.

The image reader 3 includes a pair of light sources 30A and 30B, a light-guide body 31, a first mirror 32A, a second mirror 32B, a third mirror 32C, a lens 33, and a line sensor 34. The light sources 30A and 30B are respectively provided at the left end and the right end of the main scanning direction. The light-guide body 31 guides illumination light from the light sources 30A and 30B to the first read area 3a or to the second read area 3b. The first mirror 32A, the second mirror 32B, and the third mirror 32C reflect reflection light that is produced when the illumination light from the light sources 30A and 30B is reflected by the surface of the document 20 in the first read area 3a or in the second read area 3b. The lens 33 is a lens for a reduction optical system that condenses the reflection light from the third mirror 32C. The line sensor 34 receives the light condensed by the lens 33 and outputs a read signal.

The line sensor 34 is constituted by plural solid-state imaging devices that are arranged in the main scanning direction, and a charge-coupled device (CCD) line sensor may be used as the line sensor 34, for example. However, the line sensor 34 is not limited to this type of line sensor and may be another type of solid-state imaging device array, such as a complementary metal-oxide semiconductor (CMOS) image sensor.

The image reader 3 includes a housing 35 that houses the light sources 30A and 30B, the light-guide body 31, the first mirror 32A, the second mirror 32B, the third mirror 32C, the lens 33, and the line sensor 34. The document loading table 36, which is formed of an optically transparent material such as glass, is provided to the upper portion of the housing 35.

The light sources 30A and 30B, the light-guide body 31, and the first mirror 32A are fixed to the first carriage 37A, which is movable in the sub-scanning direction A, and the second mirror 32B and the third mirror 32C are fixed to the second carriage 37B. The second carriage 37B is configured to be movable in the sub-scanning direction A and to move a distance corresponding to half the move distance of the first carriage 37A so that the optical path length from the upper surface of the document loading table 36 to the light-receiving surface of the line sensor 34 is always constant. Upon reading an image on the surface of the document 20 loaded onto the document loading table 36, the first carriage 37A and the second carriage 37B are set to move in the sub-scanning direction A to their respective positions as illustrated in FIG. 1 with a motor not illustrated.

Foreign material, such as paper dust from the document 20 or other dust, may adhere to the document loading table 36 in the first read area 3a or in the second read area 3b. In this case, an image of the foreign material is included in image data read from the document 20 because of the foreign material present between the document loading table 36 and the document 20. In a case where foreign material is present in the second read area 3b, a dot image is included in the image data. In a case where foreign material is present in the first read area 3a, a streak-like image portion (hereinafter referred to as "streak image portion") that extends in the sub-scanning direction A is included in the image data. A streak image portion is visually noticeable, and therefore, it is desirable to remove the streak image portion to a maximum extent.

Figure 2:
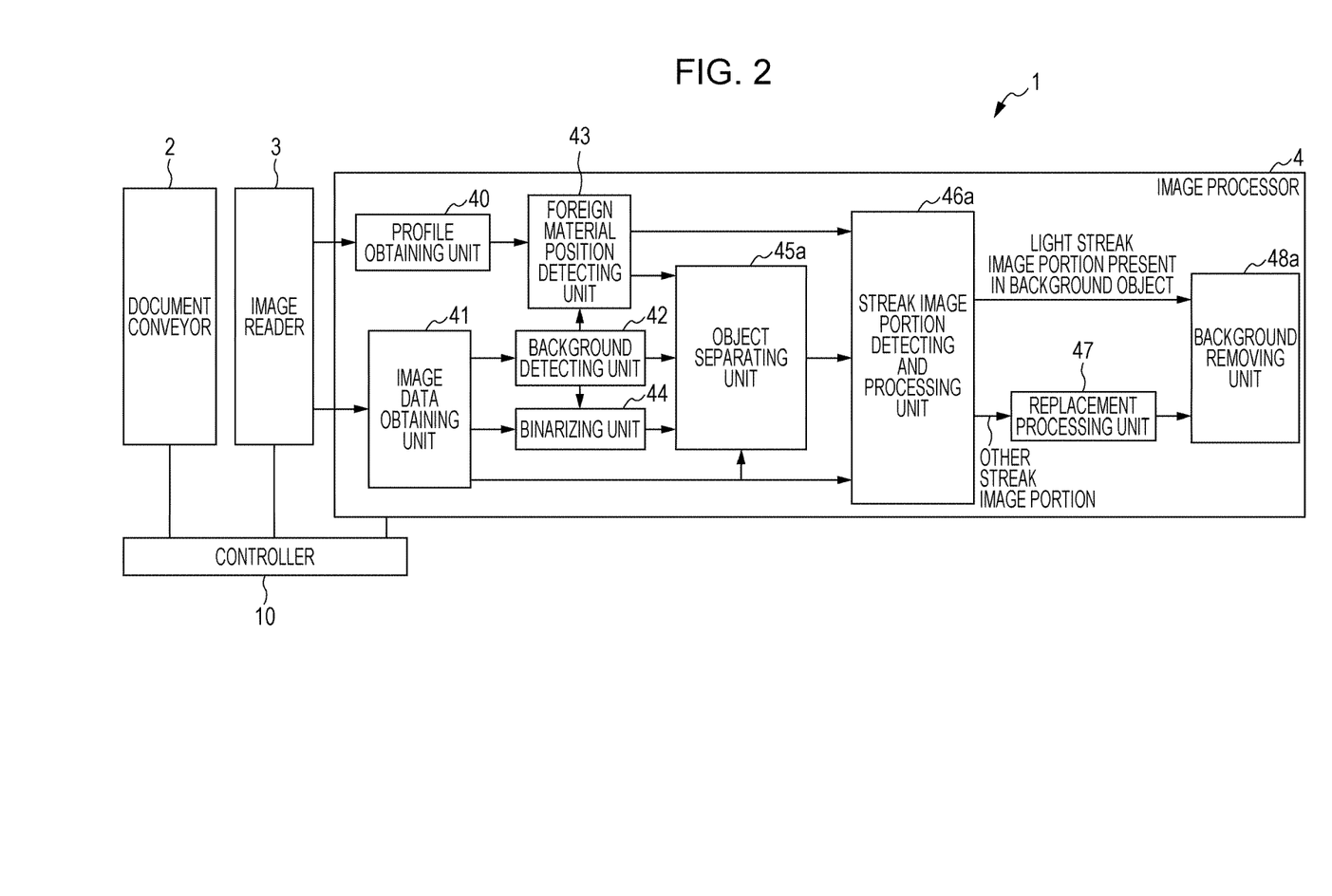
FIG. 2 is a block diagram illustrating an example control system of the image reading apparatus according to the first exemplary embodiment.

FIG. 2 is a block diagram illustrating an example control system of the image reading apparatus 1 according to this exemplary embodiment. The image reading apparatus 1 further includes an image processor 4 and a controller 10 in addition to the document conveyor 2 and the image reader 3 described above. The image processor 4 performs image processing on image data obtained by the image reader 3, such as removal of a streak image portion. The controller 10 controls the document conveyor 2, the image reader 3, and the image processor 4.

The image processor 4 includes a profile obtaining unit 40, an image data obtaining unit 41, a background detecting unit 42, a foreign material position detecting unit 43, a binarizing unit 44, an object separating unit 45a, a streak image portion detecting and processing unit 46a, a replacement processing unit 47, and a background removing unit 48a.

The object separating unit 45a and the streak image portion detecting and processing unit 46a constitute an example of a separation processor. The separation processor performs a process, specifically, separates image data into plural objects including a background object corresponding to the background of the document 20, detects a streak image portion caused by foreign material present in the first read area 3a and included in the image data on the basis of a profile, and if a pixel of the streak image portion is present in the background object and has a pixel value equal to or smaller than a threshold (also referred to as "background removal threshold") determined on the basis of a representative value of the background, assumes the pixel to belong to the background object.

The profile obtaining unit 40 obtains as a profile a read signal obtained by the line sensor 34 scanning the first read area 3a in which the document 20 is not present. The profile is an example of foreign material position information. The profile obtaining unit 40 is an example of a foreign material position information obtaining unit.

The image data obtaining unit 41 obtains a read signal obtained by the line sensor 34 reading the document 20 that passes over the first read area 3a as image data of the document 20 for one page.

The background detecting unit 42 detects from the image data obtained by the image data obtaining unit 41 a representative value of pixel values that correspond to the background of the document 20. For example, the background detecting unit 42 generates a density histogram of the image data obtained by the image data obtaining unit 41 and detects, as a representative value of the background, a pixel value having the highest frequency. As a representative value of the background, the average value of one line or plural lines on the front end of the document 20 may be used.

The foreign material position detecting unit 43 detects the position of foreign material in the main scanning direction on the basis of the representative value of the background output from the background detecting unit 42.

The binarizing unit 44 binarizes the image data obtained by the image data obtaining unit 41 by using the representative value of the background detected by the background detecting unit 42 as a threshold and generates binary image data.

The object separating unit 45a separates, on the basis of the binary image data output from the binarizing unit 44, the image data of the document 20 into plural objects (background, photographic, graphic, text, line, and other objects) including a background object corresponding to the background of the document 20 in accordance with the types of images. The object separating unit 45a extracts, for each object included in the image data, the arrangement (the position in an X direction, which corresponds to the main scanning direction, the position in a Y direction, which corresponds to the sub-scanning direction, the width, and the height) and the type (background, photographic, graphic, text, line, and so on, for example) of the object. The object separating unit 45a performs separation into objects by taking into consideration the position of foreign material. That is, if the position of a pixel in the main scanning direction matches the position of foreign material, the pixel is assumed to be a pixel of a streak image portion and is excluded from object separation. That is, line objects do not include a streak image portion.

The streak image portion detecting and processing unit 46a detects a streak image portion caused by foreign material present in the first read area 3a and included in the image data on the basis of the position of the foreign material detected by the foreign material position detecting unit 43. That is, the streak image portion detecting and processing unit 46a detects an image portion that corresponds to the position of the foreign material in the main scanning direction and that extends in the sub-scanning direction A as a streak image portion.

In a case where a pixel of the streak image portion is present in the background object and has a pixel value equal to or smaller than the background removal threshold, that is, the streak image portion is an image having a low density, the streak image portion detecting and processing unit 46a does not perform a replacement process but performs a process for assuming the pixel to belong to the background object. The background removal threshold may be a representative value of the background or a value other than a representative value of the background.

The replacement processing unit 47 performs a replacement process for replacing the pixel value of a pixel of a streak image portion that is present in an object other than the background object with a representative value of the pixel values of pixels in a peripheral area in the other object, and replacing the pixel value of a pixel of a streak image portion that is present in the background object and that has a high density with a representative value of the pixel values of pixels in a peripheral area in the background object. In the replacement process, the pixel value of a pixel of a streak image portion is replaced with the average value of the pixel values of plural pixels in the right and left areas adjacent to the streak image portion in the main scanning direction. The replacement process is not limited to this process, and the pixel value of a pixel of a streak image portion may be replaced with a predetermined pixel value.

Figure 3:
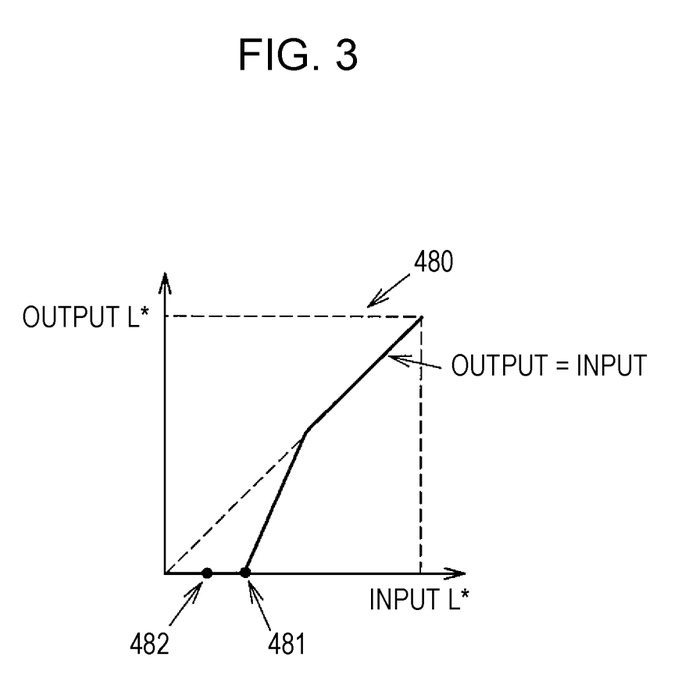
FIG. 3 is an example lookup table retained by a background removing unit.

FIG. 3 is a diagram illustrating an example lookup table retained by the background removing unit 48a. The background removing unit 48a retains a lookup table 480 illustrated in FIG. 3. The lookup table 480 is an example of a conversion table in which a relationship between an input value and an output value is specified. The background removing unit 48a uses each of the pixel value of a pixel that belongs to the background object in the image data separated by the object separating unit 45a and the pixel value of a pixel that is assumed, by the streak image portion detecting and processing unit 46a, to belong to the background object as an input value and converts the input value into an output value by referring to the lookup table 480. Consequently, if a pixel value 482 of a pixel that belongs to the background object is equal to or smaller than a background removal threshold 481, which is determined on the basis of a representative value of the background, the pixel value 482 is set to zero. That is, in a case of a streak image portion that is light and that includes a pixel having the pixel value 482 smaller than the background removal threshold 481, the pixel value 482 is replaced with zero.

Operation Performed by Image Reading Apparatus

Now, an example operation performed by the image reading apparatus 1 is described with reference to FIGS. 4A and 4B to FIG. 7.

Figure 7:
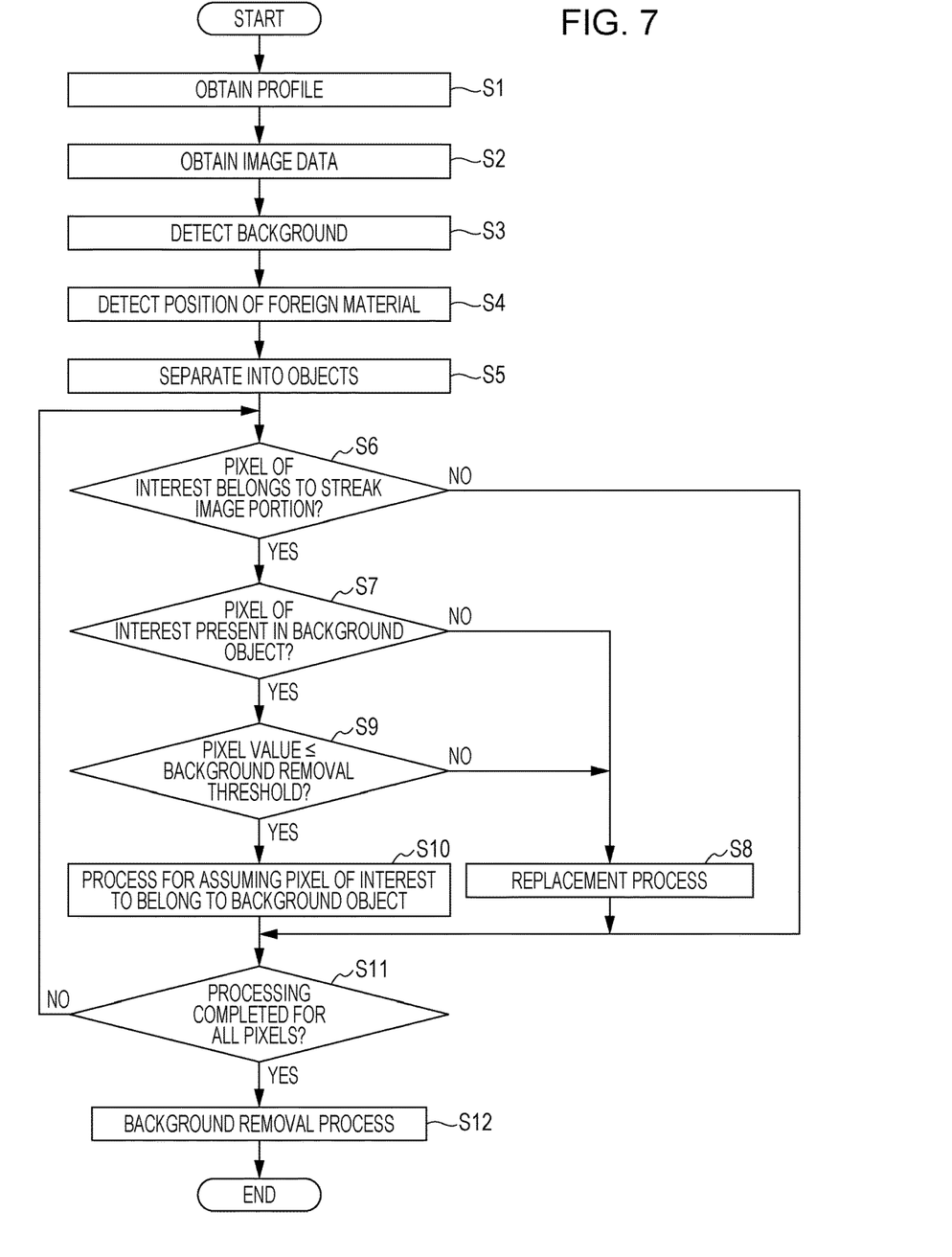
FIG. 7 is a flowchart illustrating an example operation performed by an image processor according to the first exemplary embodiment.

FIG. 7 is a flowchart illustrating an example operation performed by the image processor 4.

(1) Obtaining Profile and Image Data

A user loads the document 20 onto the paper feed tray 21 of the document conveyor 2 and gives an instruction for reading the document 20 by operating an operation unit not illustrated.

The controller 10 performs control to start reading the document 20 in the first read mode in response to conveyance of the document 20 by the document conveyor 2. The controller 10 performs control to cause the image reader 3 to scan the first read area 3a in which the document 20 is not present before the conveyance and reading of the document 20. The line sensor 34 of the image reader 3 scans the first read area 3a and transmits a read signal for one line or several lines to the profile obtaining unit 40 of the image processor 4.

The profile obtaining unit 40 obtains the read signal from the line sensor 34 as a profile (step S1). The profile obtaining unit 40 outputs the obtained profile to the foreign material position detecting unit 43.

The controller 10 performs control to cause the document conveyor 2 and the image reader 3 to convey and read the document 20. The document conveyor 2 causes the driving unit not illustrated to drive the separating roll 230, the conveying rolls 231, and the read roll 232 to make the document 20 on the paper feed tray 21 be conveyed and pass over the first read area 3a, and to drive the ejecting rolls 233 and 234 to make the document 20 be ejected to the paper output tray 22.

A read signal is transmitted from the line sensor 34 to the image data obtaining unit 41 while the document 20 passes over the first read area 3a. The image data obtaining unit 41 obtains the read signal from the line sensor 34 as image data of the document 20 for one page (step S2).

(2) Detecting Streaks

The background detecting unit 42 generates a density histogram of the image data obtained by the image data obtaining unit 41, for example, and detects, as a representative value of the background, a pixel value having the highest frequency (step S3).

Figure 4A:
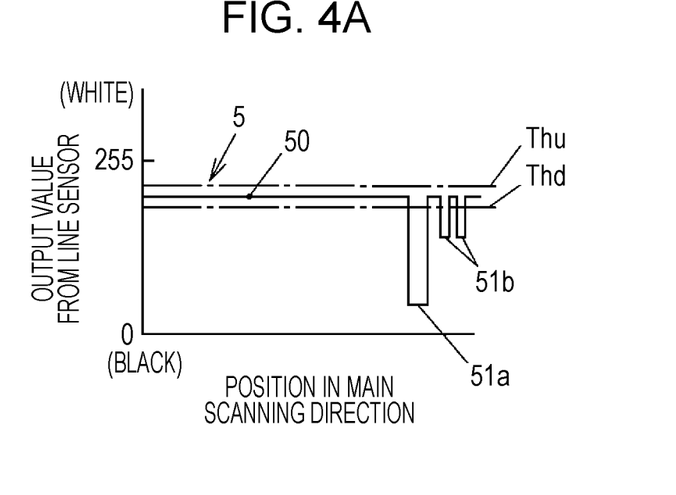
FIG. 4A is a diagram illustrating an example profile before image data illustrated in FIG. 4B is obtained.
Figure 4B:
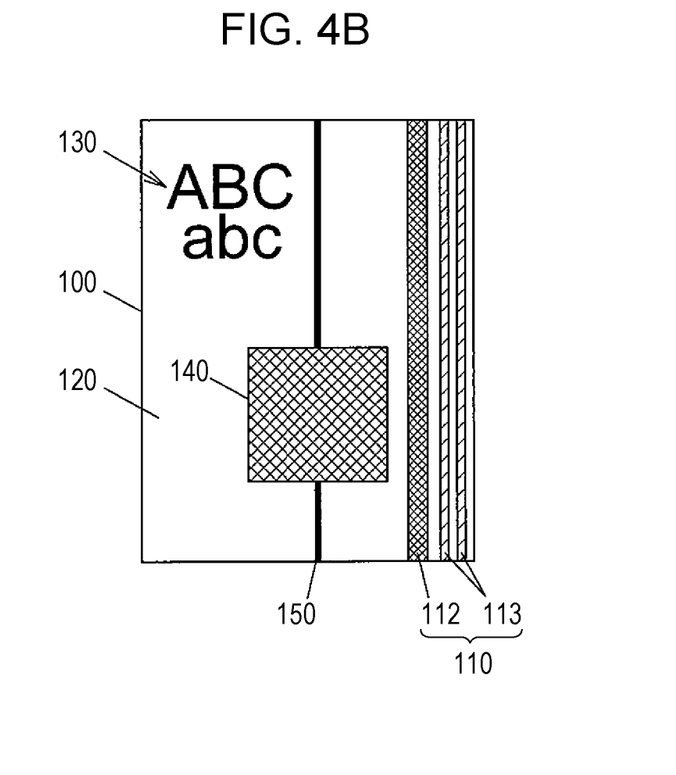
FIG. 4B is a diagram illustrating the image data, which is an example, obtained by an image data obtaining unit.

FIG. 4A is a diagram illustrating an example profile before image data illustrated in FIG. 4B is obtained, and FIG. 4B is a diagram illustrating the image data, which is an example, obtained by the image data obtaining unit 41. As illustrated in FIG. 4B, image data 100 includes a streak image portion 110, a background object 120, a text object 130, a graphic object 140, and a line object 150. In the streak image portion 110 in FIG. 4B, a dark black streak image portion 112 and light gray streak image portions 113 are present.

The foreign material position detecting unit 43 determines a threshold Thu for streak detection, which is a threshold above a representative value 50 (see FIG. 4A) of the background output from the background detecting unit 42, and a threshold Thd for streak detection, which is a threshold below the representative value 50 of the background, and detects the position of foreign material in the main scanning direction on the basis of a profile 5 output from the profile obtaining unit 40 by using the thresholds Thu and Thd for streak detection (step S4). That is, in the case illustrated in FIG. 4A, the positions in the main scanning direction corresponding to output values (pixel values) 51a and 51b that are output from the line sensor 34 and that are smaller than the threshold Thd for streak detection are detected as the positions of foreign material in the main scanning direction. The output value 51a and the output values 51b from the line sensor 34 correspond to the dark black streak image portion 112 and the light gray streak image portions 113 respectively.

The binarizing unit 44 binarizes the image data obtained by the image data obtaining unit 41 by using the representative value of the background detected by the background detecting unit 42 as a threshold and generates binary image data.

The object separating unit 45a separates, on the basis of the binary image data generated by the binarizing unit 44, the image data of the document 20 into plural objects (background, photographic, graphic, text, line, and other objects) including a background object corresponding to the background of the document 20 in accordance with the types of images (step S5). In the case of the image data 100 illustrated in FIG. 4B, the object separating unit 45a separates the image data 100 into the background object 120, the text object 130, the graphic object 140, and the line object 150. The object separating unit 45a does not separate a pixel in the image data as a pixel belonging to a line object if the position of the pixel in the main scanning direction matches the position of foreign material detected by the foreign material position detecting unit 43.

The streak image portion detecting and processing unit 46a determines whether a pixel of interest in the image data (hereinafter referred to as "pixel of interest") belongs to the streak image portion 110 (step S6).

If the streak image portion detecting and processing unit 46a determines that the pixel of interest belongs to the streak image portion 110 (Yes in step S6), the streak image portion detecting and processing unit 46a determines whether the pixel of interest is present in the background object (step S7). If the streak image portion detecting and processing unit 46a determines that the pixel of interest is present in an object other than the background object (No in step S7), the streak image portion detecting and processing unit 46a causes the replacement processing unit 47 to perform a replacement process on the pixel of interest. The replacement processing unit 47 performs a replacement process for replacing the pixel value of the pixel of interest with a representative value of the pixel values of pixels in a peripheral area in the other object (step S8).

If the streak image portion detecting and processing unit 46a determines that the pixel of interest is present in the background object (Yes in step S7), the streak image portion detecting and processing unit 46a determines whether the pixel value of the pixel of interest is equal to or smaller than a background removal threshold (step S9). If the pixel value of the pixel of interest is larger than the background removal threshold (No in step S9), the streak image portion detecting and processing unit 46a causes the replacement processing unit 47 to perform the replacement process on the pixel of interest (step S8).

If the streak image portion detecting and processing unit 46a determines that the pixel value of the pixel of interest is equal to or smaller than the background removal threshold (Yes in step S9), the streak image portion detecting and processing unit 46a performs a process for assuming the pixel of interest to belong to the background object (step S10).

Figure 5:
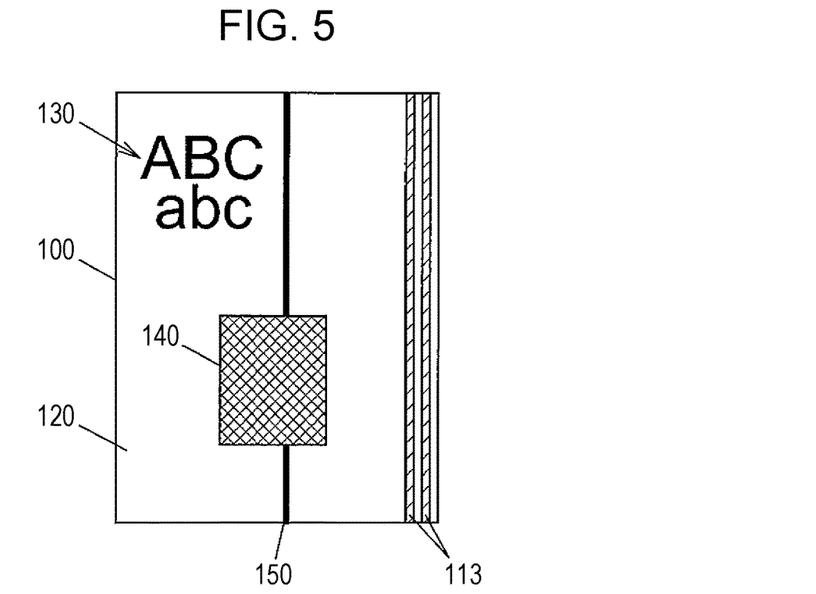
FIG. 5 is a diagram illustrating the example image data after a replacement process.

As illustrated in FIG. 5, the black streak image portion 112 having a high density is not present any more in the image data 100 after the replacement process; however, the gray streak image portions 113 having a low density remain as is.

(3) Removing Background

When processing in steps S6 to S10 described above is completed for all of the pixels in the image data 100 (Yes in step S11), the background removing unit 48a performs a background removal process (step S12). That is, the background removing unit 48a performs conversion on the pixel values of pixels that belong to the background object in the image data 100 separated by the object separating unit 45a and on the pixel values of pixels that are assumed, by the streak image portion detecting and processing unit 46a, to belong to the background object by using the lookup table 480 illustrated in FIG. 3.

Figure 6:
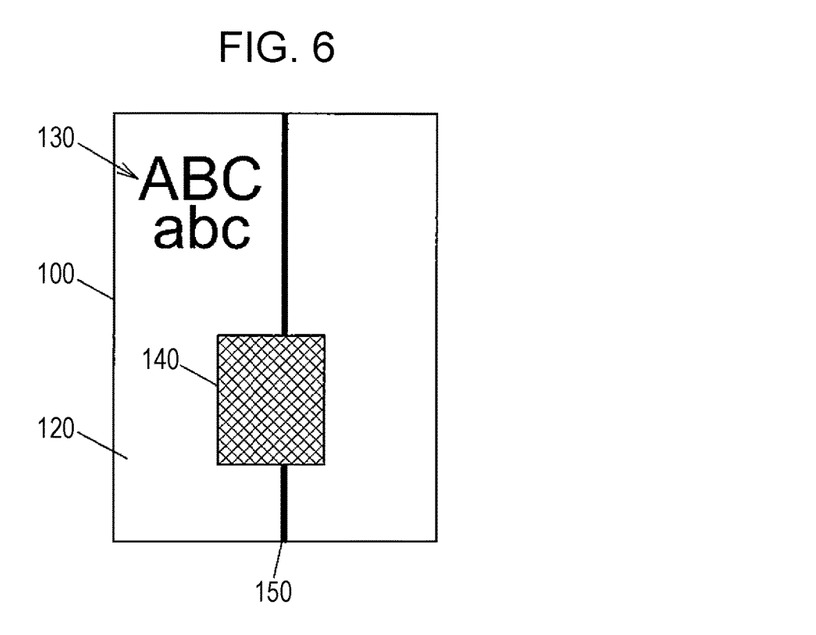
FIG. 6 is a diagram illustrating the example image data after a background removal process.

After the background removal process, the image data 100 that includes no streak or no noticeable streak is obtained, as illustrated in FIG. 6. In FIG. 6, the gray streak image portions 113 having a low density, which are visible in FIG. 5, are not present any more in the image data 100.

Second Exemplary Embodiment

Figure 8:
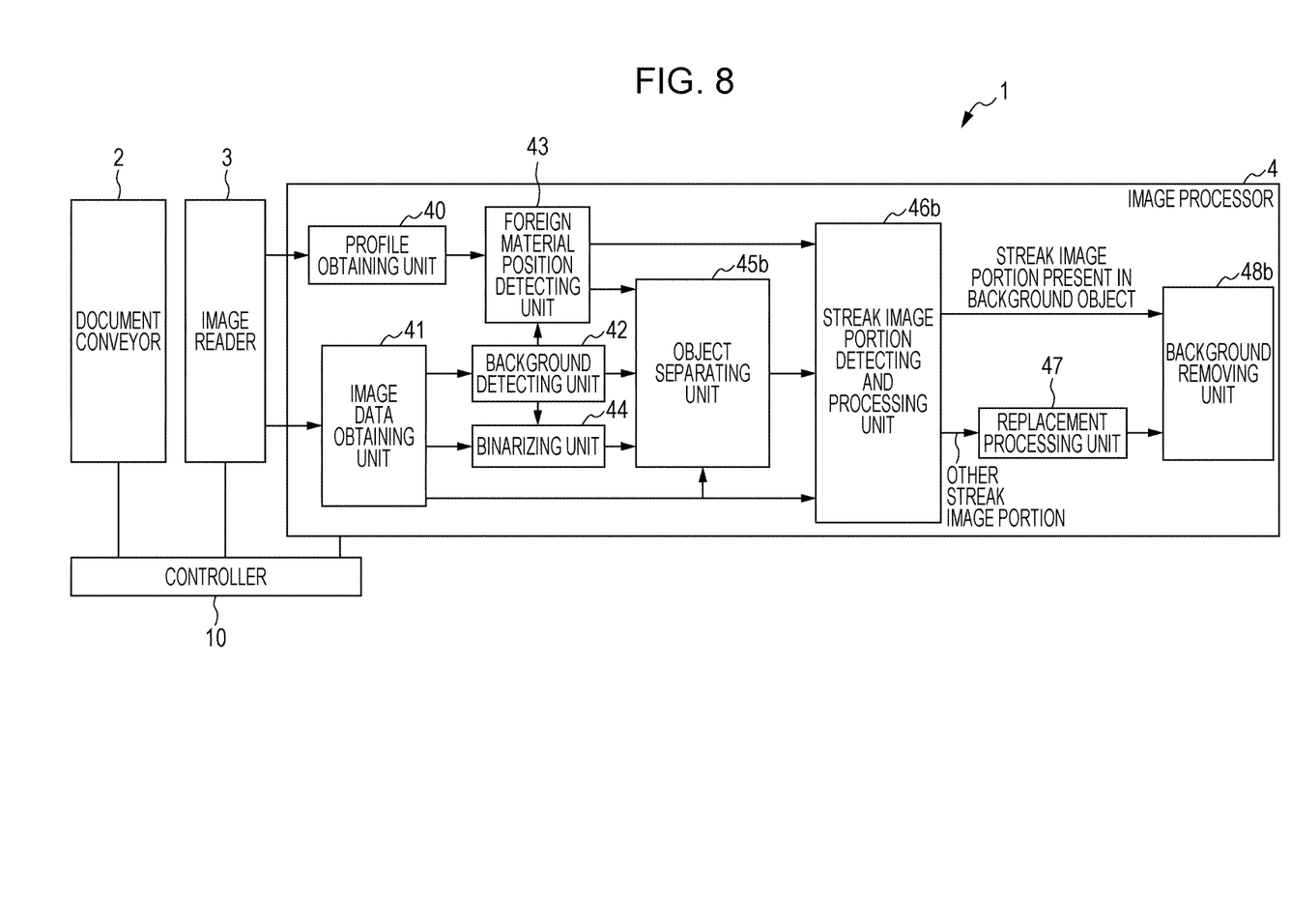
FIG. 8 is a block diagram illustrating an example control system of the image reading apparatus according to a second exemplary embodiment of the present invention.

FIG. 8 is a block diagram illustrating an example control system of the image reading apparatus 1 according to a second exemplary embodiment of the present invention. In the first exemplary embodiment, a streak image portion that is present in the background object and that has a low density is removed in the background removal process, and a streak image portion that is present in the background object and that has a high density and a streak image portion that is present in an object other than the background image are removed in the replacement process. In this exemplary embodiment, a streak image portion that belongs to the background image is removed in the background removal process, and a streak image portion that is present in an object other than the background object is removed by replacement with a representative value of a peripheral area in the other object. The second exemplary embodiment, specifically, a difference from the first exemplary embodiment, is described below.

The image processor 4 according to this exemplary embodiment includes the profile obtaining unit 40, the image data obtaining unit 41, the background detecting unit 42, the foreign material position detecting unit 43, the binarizing unit 44, and the replacement processing unit 47, which are substantially the same as in the first exemplary embodiment, and further includes an object separating unit 45b, a streak image portion detecting and processing unit 46b, and a background removing unit 48b, which are different from the first exemplary embodiment.

The object separating unit 45b and the streak image portion detecting and processing unit 46b constitute an example of a separation processor. The separation processor performs a process, specifically, separates image data into plural objects including a background object corresponding to the background of the document 20, detects a streak image portion caused by foreign material present in the first read area 3a and included in the image data on the basis of a profile, and if a pixel of the streak image portion is present in the background object and has a pixel value equal to or smaller than a background removal threshold, assumes the pixel to belong to the background object.

The object separating unit 45b separates, on the basis of binary image data output from the binarizing unit 44, image data of the document 20 into plural objects (background, photographic, graphic, text, line, and other objects) including a background object corresponding to the background of the document 20 in accordance with the types of images. The second exemplary embodiment is different from the first exemplary embodiment in that line objects include a streak image portion having a high density. That is, the object separating unit 45b performs separation into objects without taking into consideration the position of foreign material.

The streak image portion detecting and processing unit 46b determines a line object separated by the object separating unit 45b to be a streak image portion if the position of the line object in the main scanning direction matches the position of foreign material detected by the foreign material position detecting unit 43. The streak image portion detecting and processing unit 46b changes the line object determined to be a streak image portion to the background object.

In a case where part of a streak image portion is present in an object other than the background object, the streak image portion detecting and processing unit 46b causes the replacement processing unit 47 to perform the replacement process on the part of the streak image portion that is present in the other object.

Operation Performed by Image Reading Apparatus

Figure 9:
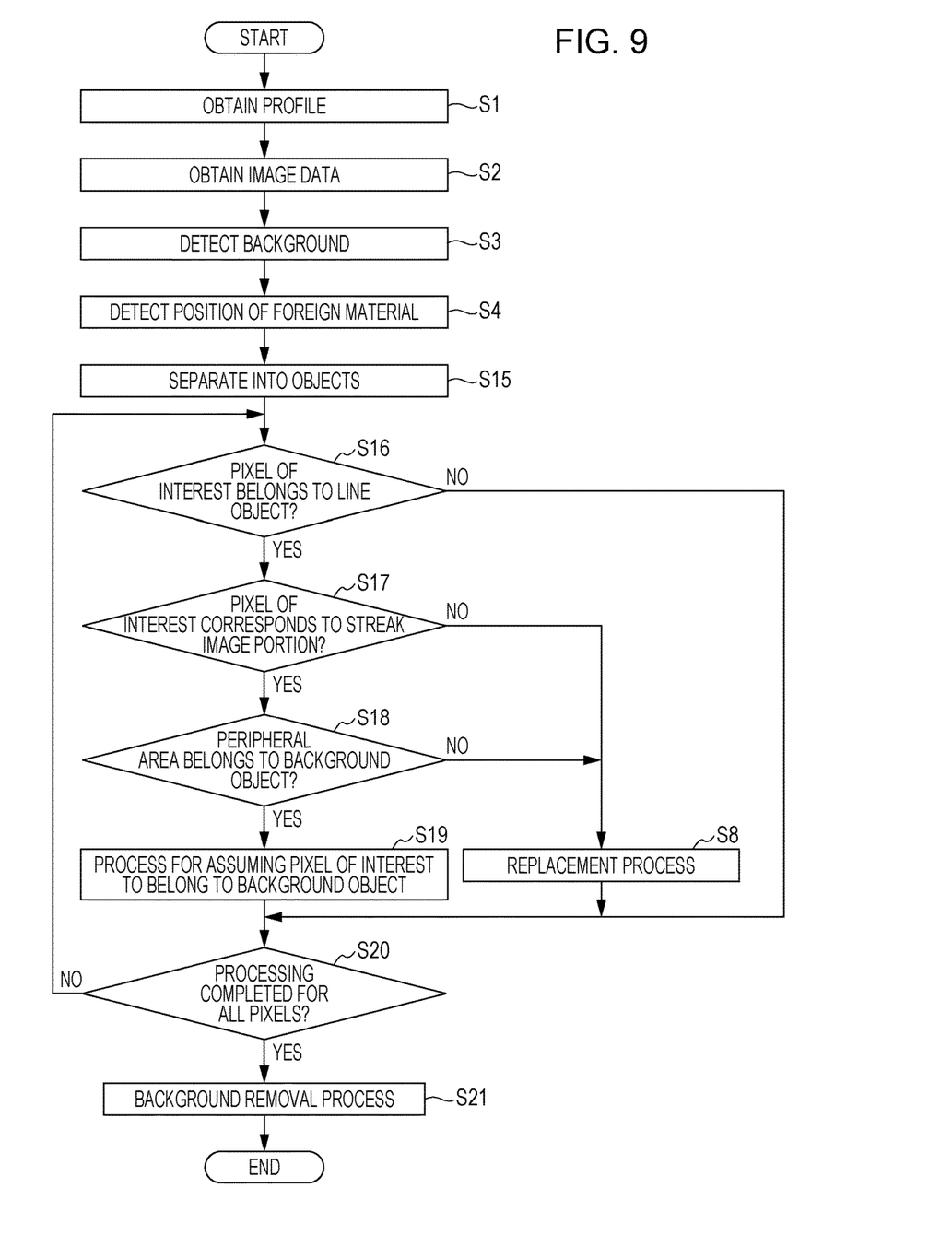
FIG. 9 is a flowchart illustrating an example operation performed by the image processor according to the second exemplary embodiment.

Now, an example operation performed by the image reading apparatus 1 is described with reference to FIG. 9. FIG. 9 is a flowchart illustrating an example operation performed by the image processor 4. A difference from the first exemplary embodiment is specifically described below.

(1) Obtaining Profile and Image Data

As in the first exemplary embodiment, the profile obtaining unit 40 obtains a read signal from the line sensor 34 as a profile (step S1), and the image data obtaining unit 41 obtains a read signal from the line sensor 34 as image data of the document 20 (step S2).

(2) Detecting Streaks

As in the first exemplary embodiment, the background detecting unit 42 detects a representative value of the background (step S3), and the foreign material position detecting unit 43 detects the position of foreign material in the main scanning direction (step S4).

As in the first exemplary embodiment, the binarizing unit 44 generates binary image data and outputs the binary image data to the object separating unit 45b.

The object separating unit 45b separates, on the basis of the binary image data output from the binarizing unit 44, the image data of the document 20 into plural objects (step S15). Here, the object separating unit 45b uses the representative value of the background detected by the background detecting unit 42 as a threshold, classifies a pixel having a pixel value equal to or smaller than the threshold among pixels of a streak image portion detected by the foreign material position detecting unit 43 as a pixel belonging to the background object, and classifies a pixel having a pixel value larger than the representative value of the background among pixels of a streak image portion detected by the foreign material position detecting unit 43 as a pixel belonging to a line object. Accordingly, line objects include a streak image portion having a high density.

The streak image portion detecting and processing unit 46b determines whether a pixel of interest belongs to a line object (step S16).

If the streak image portion detecting and processing unit 46b determines that the pixel of interest belongs to a line object (Yes in step S16), the streak image portion detecting and processing unit 46b determines whether the pixel of interest corresponds to a streak image portion (step S17). If the streak image portion detecting and processing unit 46b determines that the pixel of interest corresponds to a streak image portion (Yes in step S17), the streak image portion detecting and processing unit 46b determines whether a peripheral area of the pixel of interest belongs to the background object (step S18).

If the streak image portion detecting and processing unit 46b determines that the peripheral area of the pixel of interest does not belong to the background object (No in step S18), the streak image portion detecting and processing unit 46b causes the replacement processing unit 47 to perform a replacement process as in the first exemplary embodiment (step S8). If the streak image portion detecting and processing unit 46b determines that the peripheral area of the pixel of interest belongs to the background object (Yes in step S18), the streak image portion detecting and processing unit 46b performs a process for assuming the pixel of interest to belong to the background object (step S19).

(3) Removing Background

When processing in steps S16 to S19 and S8 described above is completed for all of the pixels in the image data (Yes in step S20), the background removing unit 48b performs a background removal process on the background object as in the first exemplary embodiment (step S21) and performs a process for replacement with the representative value of the background on the pixel values of pixels that are assumed, by the streak image portion detecting and processing unit 46b, to belong to the background object.

After the background removal process, the image data that includes no streak or no noticeable streak is obtained.

Although exemplary embodiments of the present invention have been described above, the present invention is not limited to the above-described exemplary embodiments, and various modifications and implementations are possible without departing from the spirit of the present invention. Any step may be added, deleted, changed, or replaced, for example, in the flows in the exemplary embodiments without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image processor configured to act as:
      an image data obtaining unit that obtains, as image data, a read signal read from a document that passes over a read area;
      a foreign material position information obtaining unit that obtains, as foreign material position information, a read signal read from the read area in which the document is not present; and
      a background removing unit; and
   a separation processor that separates the image data into a plurality of objects including a background object corresponding to a background of the document, detects, by using the foreign material position information, a streak image portion that is caused by foreign material present in the read area and that is included in the image data, and performs a process for assuming a pixel of the streak image portion to belong to the background object if the pixel is present in the background object and has a pixel value equal to or smaller than a threshold determined in accordance with a representative value of the background, wherein
   when separating the image data into the plurality of objects, the separation processor separates a pixel of the streak image portion having a pixel value equal to or smaller than the representative value of the background as a pixel belonging to the background object, and assumes and separates a pixel of the streak image portion having a pixel value larger than the representative value of the background as a pixel belonging to a line object, and the background removing unit converts a pixel value of a pixel that belongs to the background object separated by the separation processor by using a relationship between an input value and an output value and by using the pixel value as the input value, and converts a pixel value of a pixel that is present in the background object and that is assumed, by the separation processor, to belong to the line object into the representative value of the background.

2. An image reading method comprising:

obtaining, as image data, a read signal read from a document that passes over a read area;

obtaining, as foreign material position information, a read signal read from the read area in which the document is not present;

separating the image data into a plurality of objects including a background object corresponding to a background of the document, detecting, by using the foreign material position information, a streak image portion that is caused by foreign material present in the read area and that is included in the image data, and performing a process for assuming a pixel of the streak image portion to belong to the background object if the pixel is present in the background object and has a pixel value equal to or smaller than a threshold determined in accordance with a representative value of the background, wherein when separating the image data into the plurality of objects, the method further comprises separating a pixel of the streak image portion having a pixel value equal to or smaller than the representative value of the background as a pixel belonging to the background object, and assuming and separating a pixel of the streak image portion having a pixel value larger than the representative value of the background as a pixel belonging to a line object; and converting a pixel value of a pixel that belongs to the separated background object by using a relationship between an input value and an output value and by using the pixel value as the input value, and converting a pixel value of a pixel that is present in the background object and that is assumed to belong to the line object into the representative value of the background.

* * * * *